(12) United States Patent
Nagaura et al.

(10) Patent No.: US 7,299,124 B2
(45) Date of Patent: Nov. 20, 2007

(54) CONTROL UNIT

(75) Inventors: Wataru Nagaura, Hitachinaka (JP);
Junji Miyake, Hitachinaka (JP);
Hiroaki Komatsu, Mito (JP); Toru Irie, Farmington Hills, MI (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/504,628

(22) Filed: Aug. 16, 2006

(65) Prior Publication Data
US 2007/0043499 A1 Feb. 22, 2007

(30) Foreign Application Priority Data
Aug. 17, 2005 (JP) ............... 2005-236567

(51) Int. Cl.
*G06F 19/00* (2006.01)
(52) U.S. Cl. ............... 701/115; 701/25; 701/102
(58) Field of Classification Search ............... 701/25, 701/102, 115
See application file for complete search history.

(56) References Cited
FOREIGN PATENT DOCUMENTS

| JP | 7-040794 A | 2/1995 |
|---|---|---|
| JP | 2004-192541 A | 7/2004 |

OTHER PUBLICATIONS

OSEK OS, OSEK/VDX Operating System, Version 2.2.1, Jan. 16, 2003, pp. 1-86.

*Primary Examiner*—Stephen K. Cronin
*Assistant Examiner*—Johnny H Hoang
(74) *Attorney, Agent, or Firm*—Crowell & Moring LLP

(57) ABSTRACT

Upon initiation of a initiation processing by a task management, reference is made to a initiation table for processing of initiation, and processing of measurement is performed by an input measurement processing in response to the preset timing. Then the input value is stored in a input value storage buffer. When an application program is acquired, an input value acquisition processing is initiated, the input value is from the buffer, and is transferred to the application program. When the application program is set, an output value updating is initiated, the output value having been transferred from the application program is updated, and the result is stored in an output value storage buffer. Further, output processing means is initiated in response to the timing preset on the initiation table and an output value is outputted from the output value storage buffer.

7 Claims, 16 Drawing Sheets

| EVENT | UPDATE INFORMATION |
|---|---|
| 10msec PRE-PROCESSING | update_in1    update_in2 |
| 10msec POST-PROCESSING | update_out1 |
| 20msec PRE-PROCESSING | update_in3 |
| 20msec POST-PROCESSING | update_out2    update_out3 |
| ENGINE REF TIMING PRE-PROCESSING | update_in4 |
| ENGINE REF TIMING POST-PROCESSING | update_out4 |

US 7,299,124 B2

CONTROL UNIT

CLAIM OF PRIORITY

The present application claims priority from Japanese application serial no. 2005-236567, filed on Aug. 17, 2005, the content of which is hereby incorporated by reference into this application.

FIELD OF THE INVENTION

The present invention relates to a control unit for controlling an actuator based on external states through a sensor or network, particularly to a control unit for initiating processing synchronous with an event.

BACKGROUND OF THE INVENTION

A vehicle engine control unit controls the amount of fuel and injection timing, based on the input such as a crank angle sensor signal. Engine control belongs to an area where high-level real-time processing is required. In recent years, standardization of vehicle control software is processing mainly in Europe. One example is found in the OSEK-OS disclosed in OSEK/VDX Version, OSEK/VDX Operating System, which is the code for a real time operating system.

In the description of Japanese Patent Laid-open No. 2004-192541 and Japanese Patent Laid-open No. Hei 7 (1995)-40794, the software incorporated in the control unit is classified into an application program and an interface program. The interface program transfers the information of the input/output signal connected to a control unit over to the application program, and does not require a change of the application program in response to hardware modification.

SUMMARY OF THE INVENTION

In the aforementioned interface program, the input value to be transferred to the application is not restricted to the input signal value connected to the control unit when the input interface has been called. Namely, when the input value acquired through the input interface is a value measured and stored at a predetermined time of an event. In the output, it does not necessarily follow that the output signal connected to the control unit is outputted when the output interface has been called. To be more specific, the output value set through the output interface is the value outputted from the control unit at a predetermined event.

The timing for measuring the input signal in the interface program and the timing for outputting the output signal are incorporated at the time of developing the interface program. Accordingly, when the aforementioned timing is to be changed, the interface program per se must be modified.

The object of the present invention is to solve the aforementioned prior art problems and to provide a control unit that can be easily changed the timing, without having to modify the interface program.

The following describes the structure of the control unit of the present invention achieving the aforementioned object:

The control unit of the present invention comprises:

storage means for storing an input value from the outside or an output value to the outside separately for each input/output signal;

input means for measuring the input signal from the outside and updating the input value stored in the storage means;

output means for outputting an output signal to the outside in according with the value stored in the storage means;

input value acquisition means for transferring the input value stored in the storage means to an application program;

output value updating means for storing the output value transferred from the application program into said storage means;

initiation means for initiating said input means and output means; and initiation timing storage means for storing the initiation timing, wherein said input means and output means are initiated by said initiation means in response to the timing stored on said initiation timing storage means.

Alternatively, the control unit of the present invention is characterized in that the input means and output means are initiated in response to the timing set on the aforementioned application program, without having the aforementioned initiation means.

The present invention provides an advantage of easy modification of the timing of measuring the input signal connected to the control unit or the output signal output timing.

DESCRIPTION OF THE PREFERRED EMBODIMENTS

The control unit of the present invention has implemented interrupt-synchronous task initiation of reduced OS overhead by improving the software, without having to modify the hardware configuration or OS. The following describes a plurality of examples of the present invention with reference to drawings:

Embodiment 1

Figure 1:
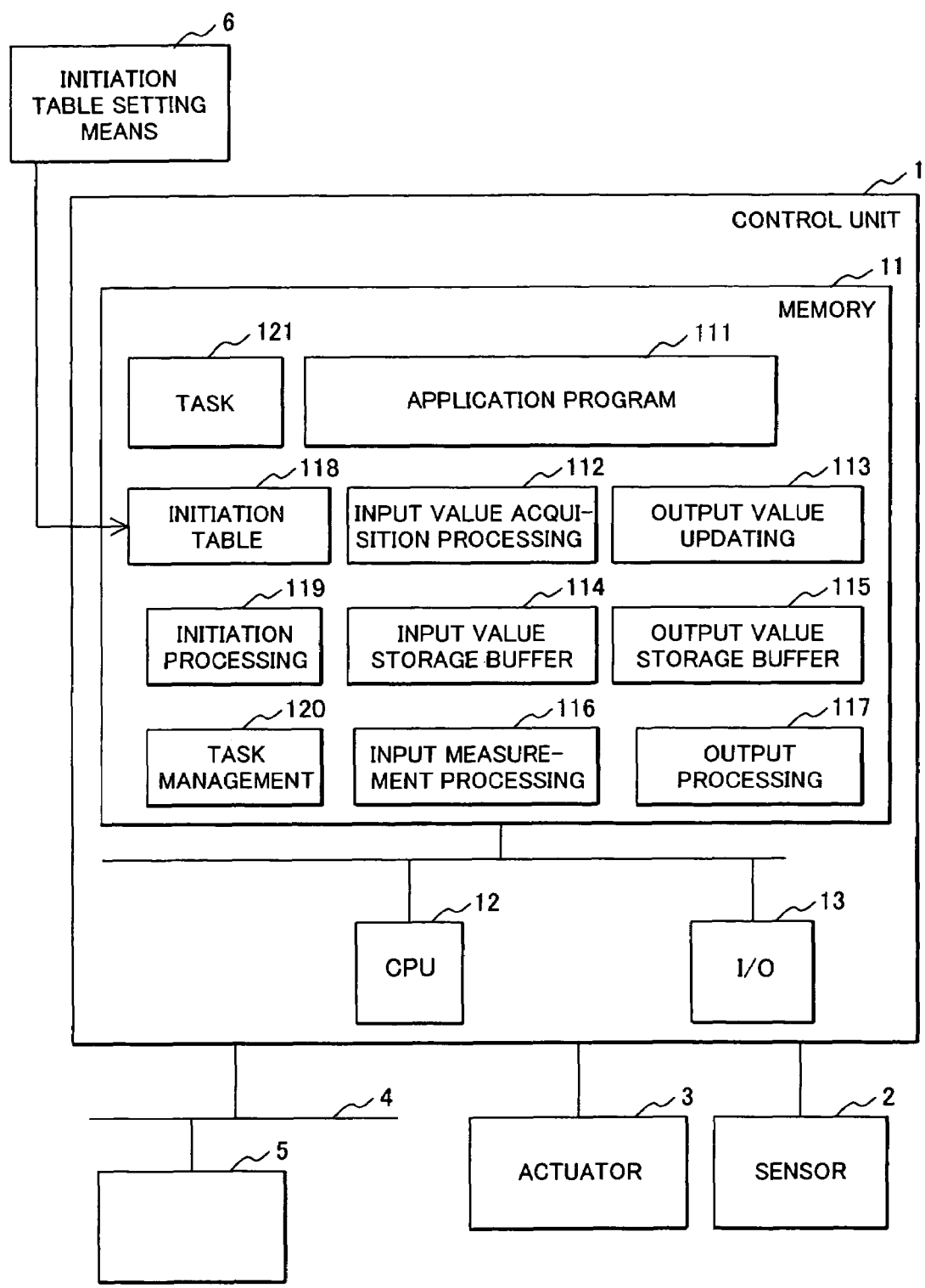
FIG. 1 shows the function block diagram representing a control unit as the first embodiment of the present invention.

FIG. 1 shows the function block diagram representing a control unit as the first embodiment of the input/output control unit of the present invention. A control unit 1 is connected with a sensor 2 and an actuator 3, and is also connected with another control unit 5 via the network 4. More than one sensor 2, actuator 3 and the control unit 5 can be connected to the control unit 1.

The control unit 1 is composed of a memory 11, CPU 12 and I/O module 13. The I/O module 13 is connected with the sensor 2, actuator 3 and network 4, and is used to capture an input value or to output data. The CPU 12 executes the program stored in the memory 11.

The memory 11 contains a task management 120 for managing the task initiation, an application program 111, input value acquisition processing 112 for transferring the input value to the application program, and output value updating 113. The memory 11 also contains an input value storage buffer 114 for storing the input value to be transferred to the application program, an output value storage buffer 115 for storing the output value transferred from the application program, an input measurement processing 116 for measuring the input value to be transferred to the application program, and an output processing 117 for outputting the output value. The memory 11 also contains an initiation table 118 that stores what processing is initiated in a predetermined event by an initiation processing 119 for initializing the input value measurement and output processing. The initiation table 118 can be set and modified by the initiation table setting means 6. In the setting or modification of the initiation table 118 by the initiation table setting means 6, the source file corresponding to the initiation table 118 prior to storage into the memory 11 is modified and the modified initiation table 118 is stored at the time of storage into stored in the memory 11.

Figure 2:
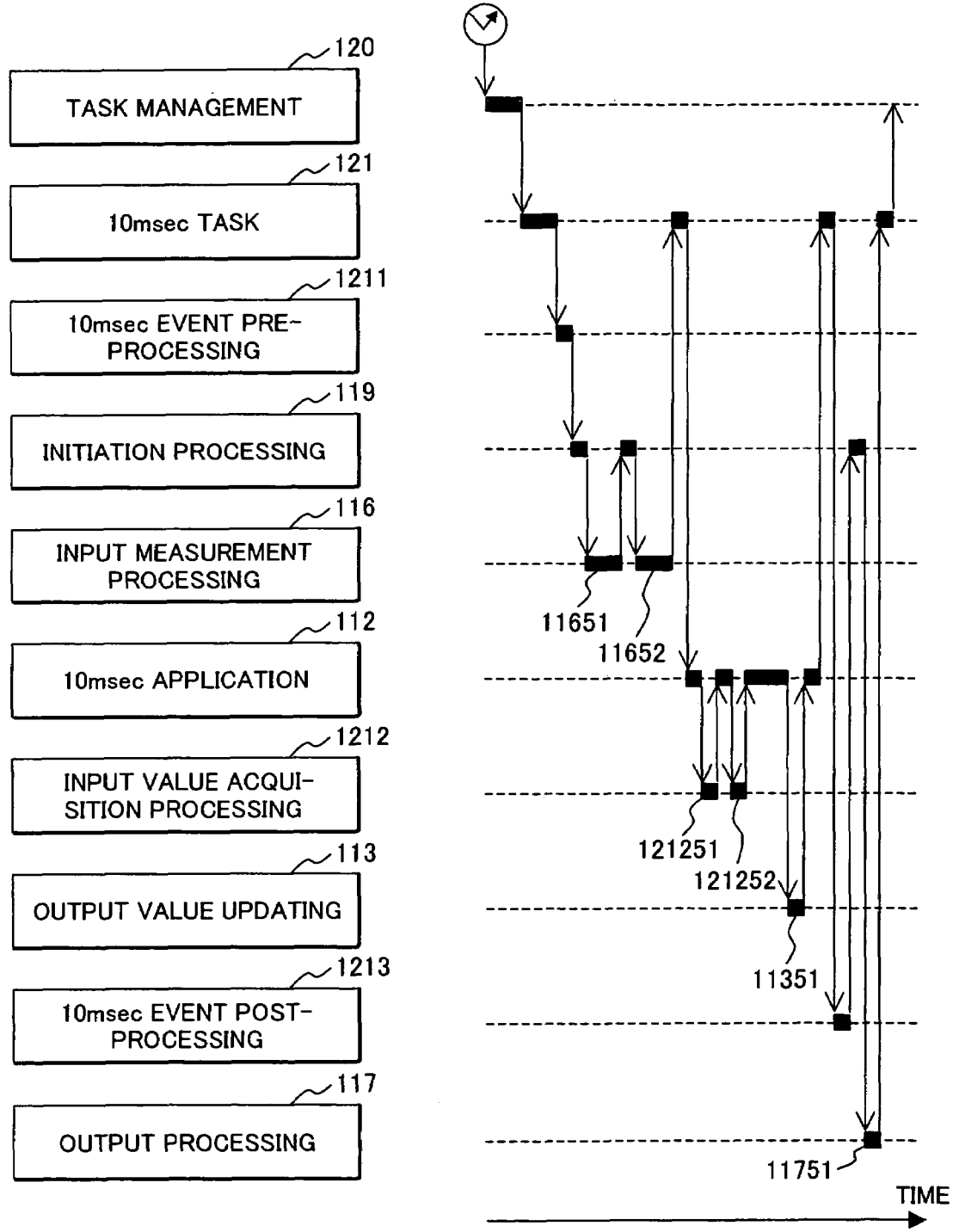
FIG. 2 is a flow chart representing the flow of 10-msec processing.

FIG. 2 is an explanatory diagram representing the flow of the processing of a program in the control unit. It explains the flow of the processing of the program stored in the control unit 1 with reference to an example of the 10-msec task as one of the tasks 121 to be initiated by the task management 120.

Figure 23:
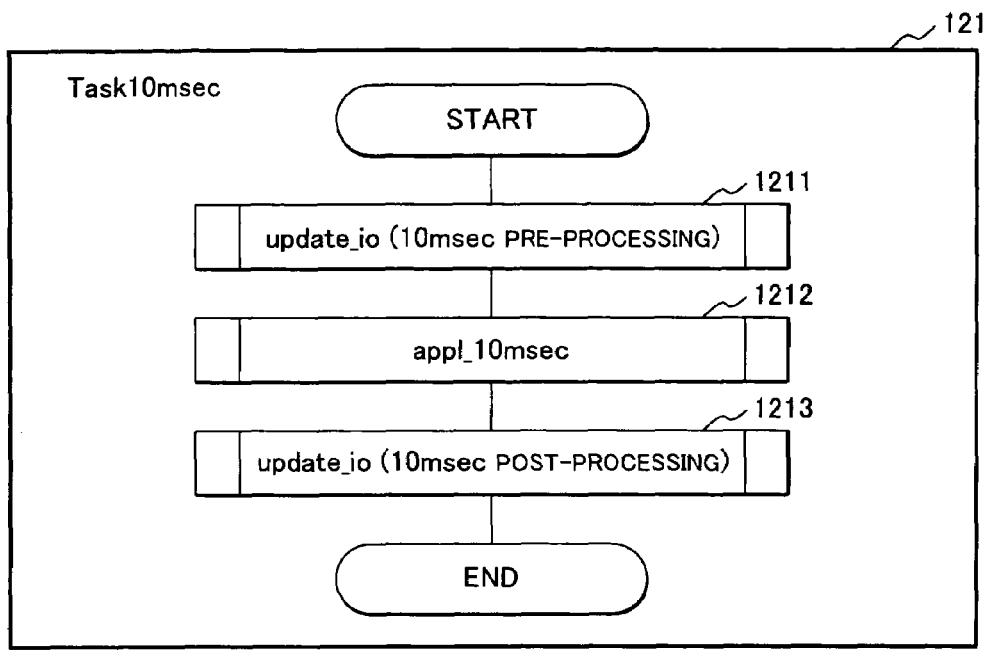
FIG. 23 is a flow chart representing the 10-msec task processing.

In part of the I/O module 13, the task management 120 is initiated by a timer (not illustrated). The task management 120 refers to the 10-msec timing in this case, and initiates the 10-msec task 121. The 10-msec task includes 10-msec event pre-processing 1211, 10-msec application 112, and 10-msec event post-processing 1213, as shown in FIG. 23.

The 10-msec application 112 initiates the 10-msec event pre-processing 1211. The 10-msec event pre-processing 1211 initiates the initiation processing 119. The initiation processing 119 will be described later.

The initiation processing 119 initiates the input measurement processing 116 registered in the 10-msec before timing of the initiation table 118. The update_in1 is executed in the processing 11651 of the input value measurement 116, and update_in2 is executed in the processing 11652.

Then the 10-msec application 112 is initiated. Input value acquisition processing 1212 is initiated in the 10-msec application to acquire in1 and in2. The get_in1 is executed in processing 121251, and get_in2 is executed in processing 122152.

After executing a predetermined processing, the application initiates the output value updating 113, and set_out1 is executed in processing 11351.

Upon termination of the 10-msec application, the 10-msec event post-processing 1213 is initiated. The output processing 117 registered in the 10-msec after timing of the initiation table 118 is executed in the 10-msec event post-processing. The update_out1 is executed in processing 11751. Upon termination of the 10-msec event post-processing, the system goes back to the 10-msec task, and the 10-msec task terminates.

The following describes the configuration and function of the components stored in the memory 11 of FIG. 1.

Figures 3, 4:
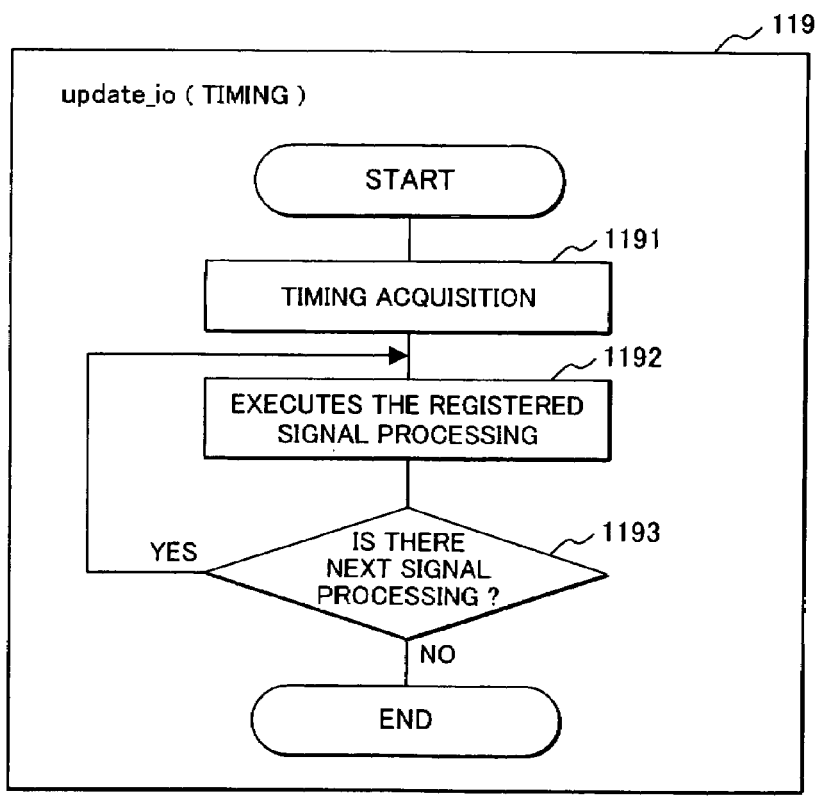
FIG. 3 is a schematic diagram representing the initiation table.
FIG. 4 is a flow chart representing the initiation processing.

FIG. 3 shows the configuration of the initiation table 118. In this example, four items in the first half of the event are concerned with synchronization in time, while the two in the latter half are related to synchronization in engine rotation. Input signals are made up of input signal 1, input signal 2, input signal 3 and input signal 4, while output signals are made up of output signal 1, output signal 2, output signal 3 and output signal 4. The input signal 1 is measured at the timing of 10-msec pre-processing initiation. The input signal 2 is measured at the timing of 10-msec pre-processing. The input signal 3 is measured at the timing of 20-msec pre-processing. The input signal 4 is measured at the timing of engine REF timing pre-processing. The output signal 1 is outputted at the timing of 10-msec post-processing. The output signal 2 is outputted at the timing of 20-msec post-processing. The output signal 3 is outputted at the timing of 20-msec post-processing. The output signal 4 is outputted at the timing of engine REF timing post-processing.

In the present Embodiment, the initiation timing of each event, and the head address for measurement corresponding to the name of the signal to be inputted and measured, or the head address for output processing corresponding to the signal name to be outputted are stored in the initiation table 118 in advance. The input measurement processing 116 for measuring the input signal in response to the pre-processing and post-processing at each timing, and the output processing 117 for outputting the output signal are executed for each signal.

FIG. 4 is a flow chart representing the initiation processing 119, which will be explained with reference to 10-msec pre-processing as an example. The initiation processing 119 is initiated by 10-msec event pre-processing and 10-msec event post-processing in the example of FIG. 2

In processing 1191, timing at this moment is acquired. Processing 1192 executes signal processing. In the first plate, the input measurement processing update_in1 of the input signal in1 registered in the initiation table 118 is implemented. In decision processing 1193, a decision is made to see whether or not there is next signal processing. Since the input processing in2 is registered, the system goes back to processing 1192 to execute the input measurement processing update_in2 of the input signal in2. In decision processing 1193, processing terminates since the next signal processing is not registered.

The initiation processing 119 is applies to the input measurement and output processing of other signals in the same manner. To be more specific, the input processing update_in3 of the input signal in3 is initiated in the 20-msec pre-processing, and update_out2 as the output processing of the output signal out2 and update_out3 as the output processing of the output signal out3 are initiated in the 20-msec post-processing. The input measuring update_in4 of the input signal in4 is initiated in the pre-process of engine REF, and the output measuring update_out4 of the output signal out4 is initiated in the post-process of engine REF.

Figure 5:
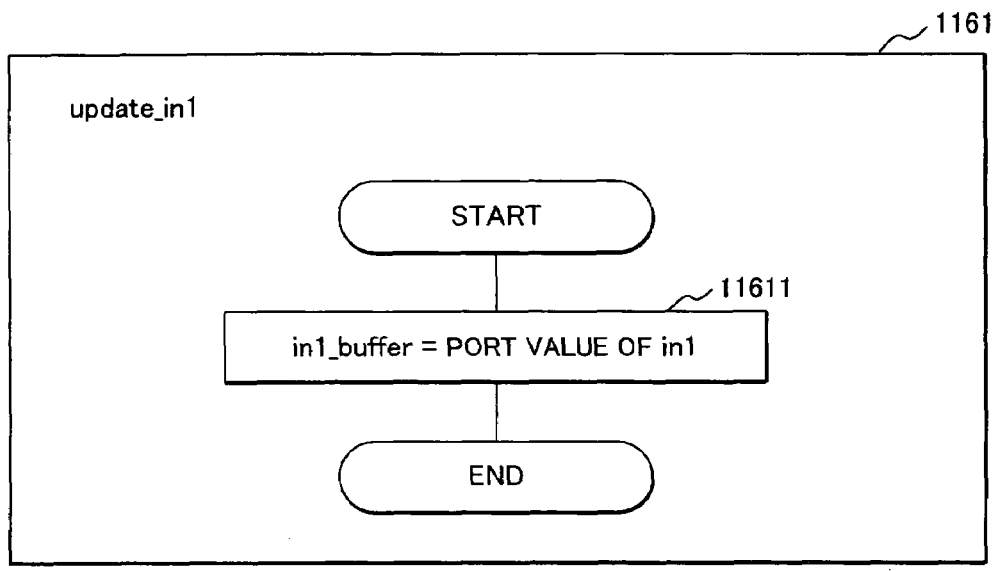
FIG. 5 is a flow chart representing the digital input in input processing.

FIG. 5 is a flow chart representing the input processing 1161. Processing 11611 measures the input value in1. For example, if the input signal is a digital input signal, the value measured is inputted into the input value storage buffer 114 for updating the stored value.

Figure 6:
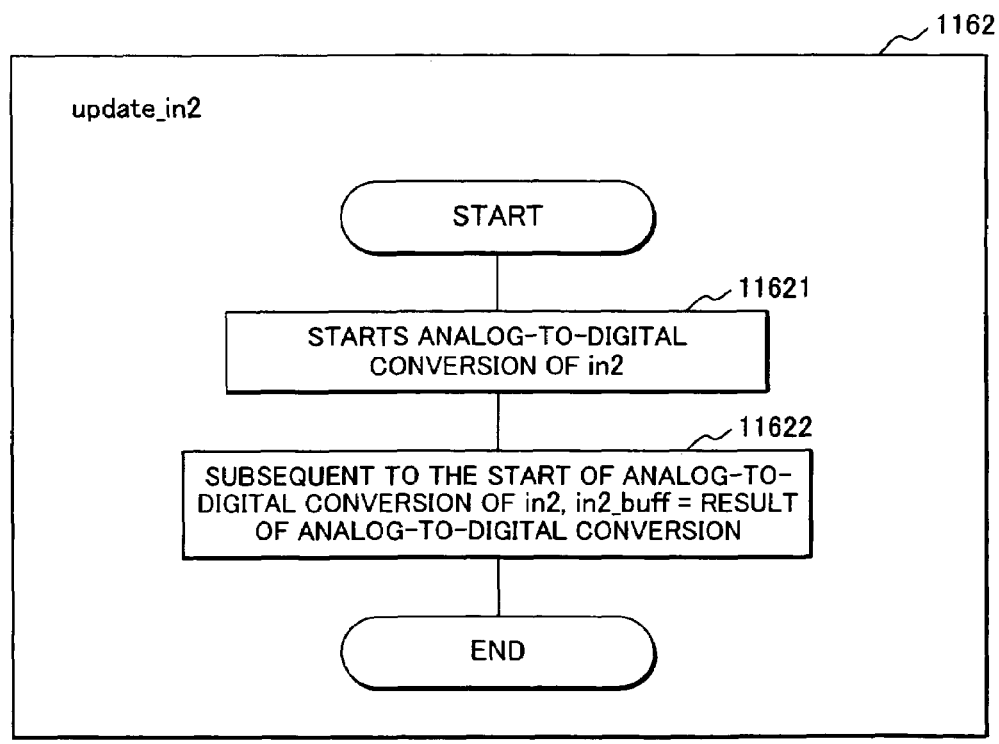
FIG. 6 is a flow chart representing the analog input in input processing.

FIG. 6 shows the processing of input measurement for analog input. Processing 11621 measures the input value in2, and starts analog-to-digital conversion. Processing 11622 updates the input value storage buffer 114, subsequent to analog-to-digital conversion.

Figure 7:
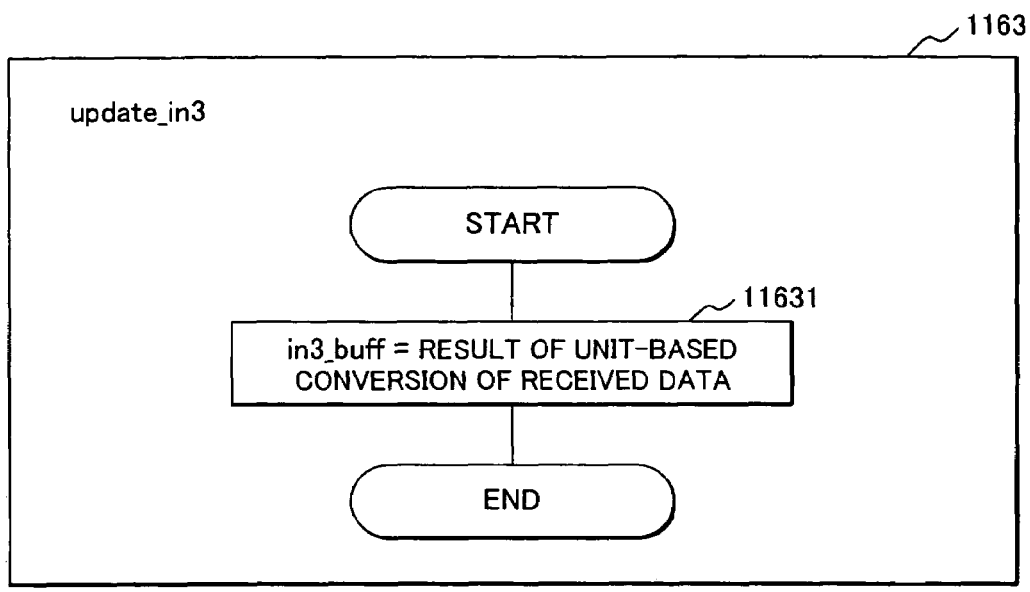
FIG. 7 is a flow chart representing the communication input in input processing.

FIG. 7 shows the processing of input measurement by another control unit. It represents processing of the data received via the network from another control unit through communication. Processing 11631 executes bit-based conversion of the received data (input value in3) to update the input value storage buffer 114. For example, when the data in3 multiplied by 2 to the power of 3 is used by the application, the value in3 is shifted left three bit positions, and the result is stored in the input value storage buffer 114.

Figure 8:
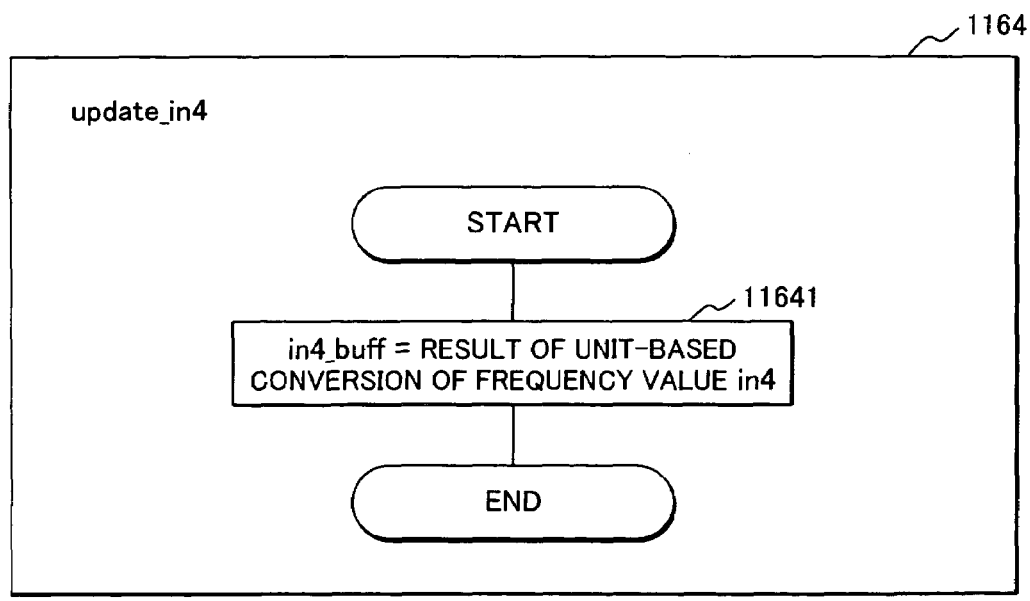
FIG. 8 is a flow chart representing the frequency input in input processing.

FIG. 8 shows the processing of input measurement for frequency input. Processing 11641 measures the frequency (input value in4), and inputs the result of unit-based conversion of the frequency value into the input value storage buffer 114 for updating.

Figure 9:
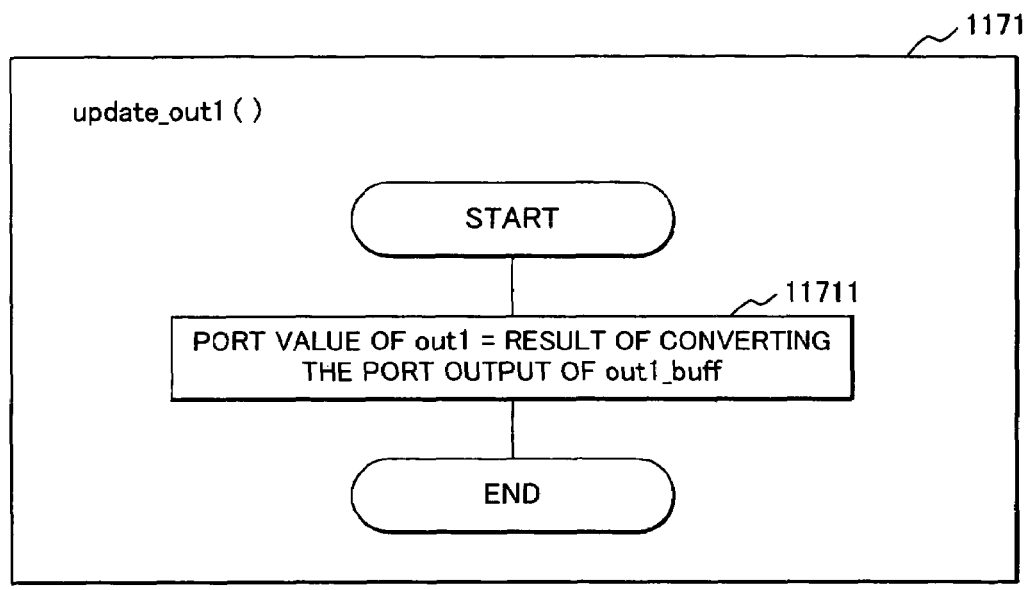
FIG. 9 is a flow chart representing the digital output in output processing.

FIG. 9 is a flow chart representing the processing of output 11711. Processing 11711 acquires the value (out1_buff) of the output value storage buffer 115 and outputs the result of port output conversion to the output signal. For example, if the output signal is a digital output signal, the port value of out1 is outputted in response to the ON/OFF value stored in the output value storage buffer. For example, if the value corresponding to the ON operation is 0, and that corresponding to the OFF is 1, 0 will be outputted if the ON is specified, and 1 will be outputted if the OFF is specified.

Figure 10:
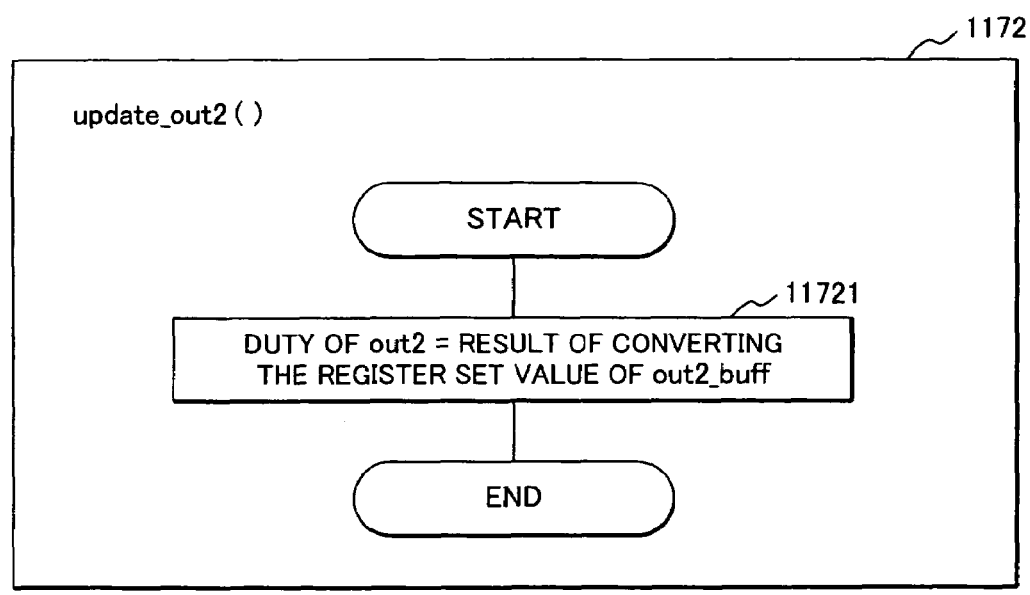
FIG. 10 is a flow chart representing the analog output in output processing.

FIG. 10 shows the case of an analog signal. In processing 11721, the analog value (duty of out2) is outputted in response to the result of converting the register set value of the value (out2_buff) of the output value storage buffer 115.

Figure 11:
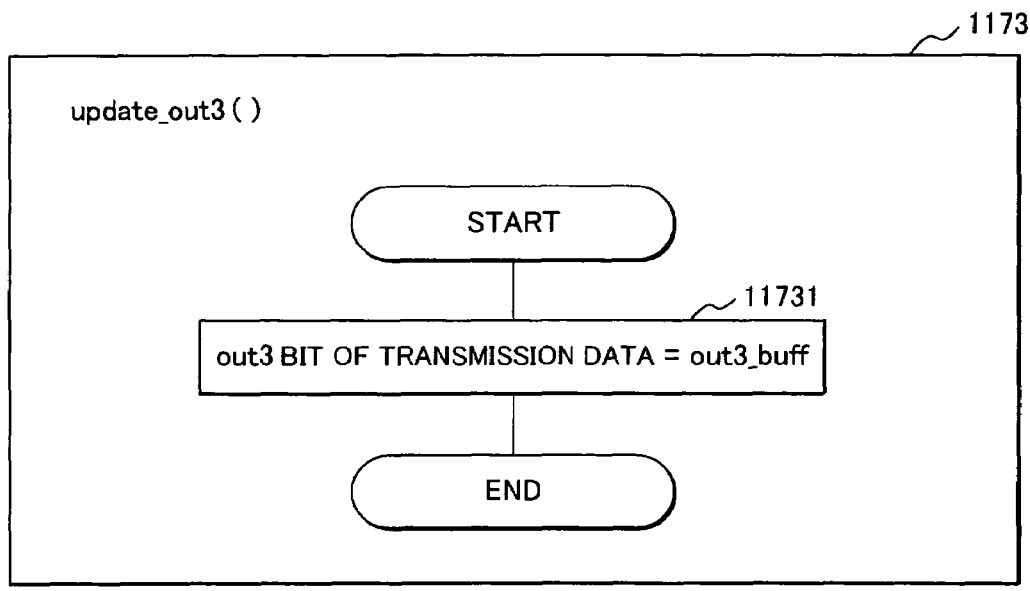
FIG. 11 is a flow chart representing the communication output in output processing.

FIG. 11 shows the processing of transmitting the output value to the network. Processing 11731 updates the transmission data (out3_buff value) to a value corresponding to the out3 bit. For example, if two-bit data from the least significant position of the transmission buffer out3_buff is the data corresponding to the out3, only the two-bit data is updated to the value of out3.

Figure 12:
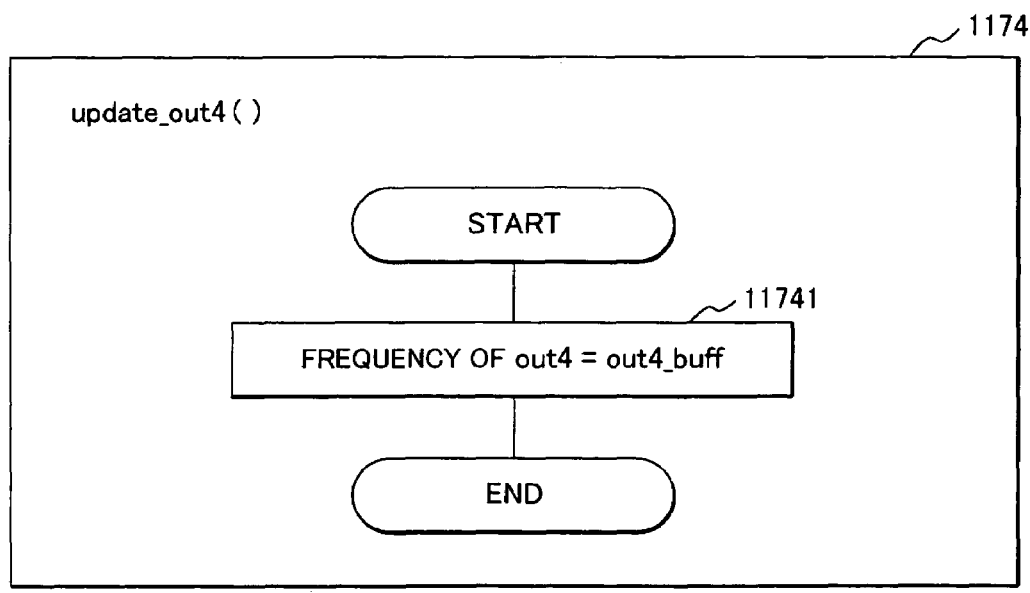
FIG. 12 is a flow chart representing the frequency output in output processing.

FIG. 12 shows the frequency output. Processing 11741 outputs the frequency of the out4 in response to the value (out4_buff) of the output value storage buffer 115. For example, if the frequency is set at 1 kHz, a 1 kHz-bit pulse is outputted.

Figure 13:
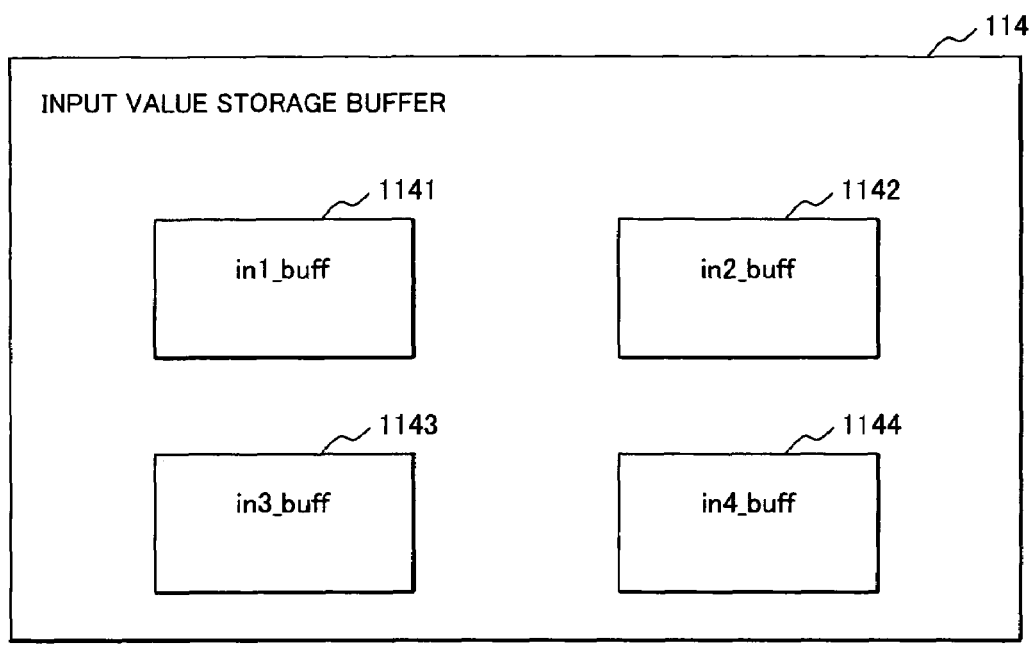
FIG. 13 is a schematic diagram showing the input value storage buffer.

FIG. 13 represents the configuration of the input value storage buffer 114. The measured value of the in1 is stored in the in1_buff storage buffer 1141. The measured value of the in2 is stored in the in2_buff storage buffer 1142. The measured value of the in3 is stored in the in3_buff storage buffer 1143. The measured value of the in4 is stored in the in4_buff storage buffer 1144.

Figure 14:
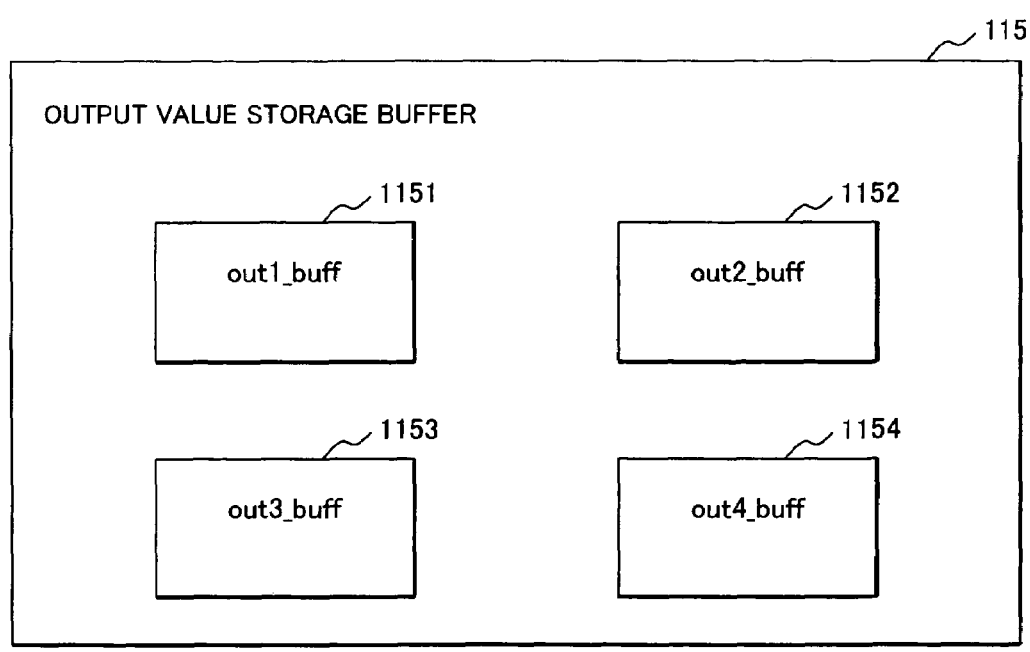
FIG. 14 is a schematic diagram showing the output value storage buffer.
Figure 15:
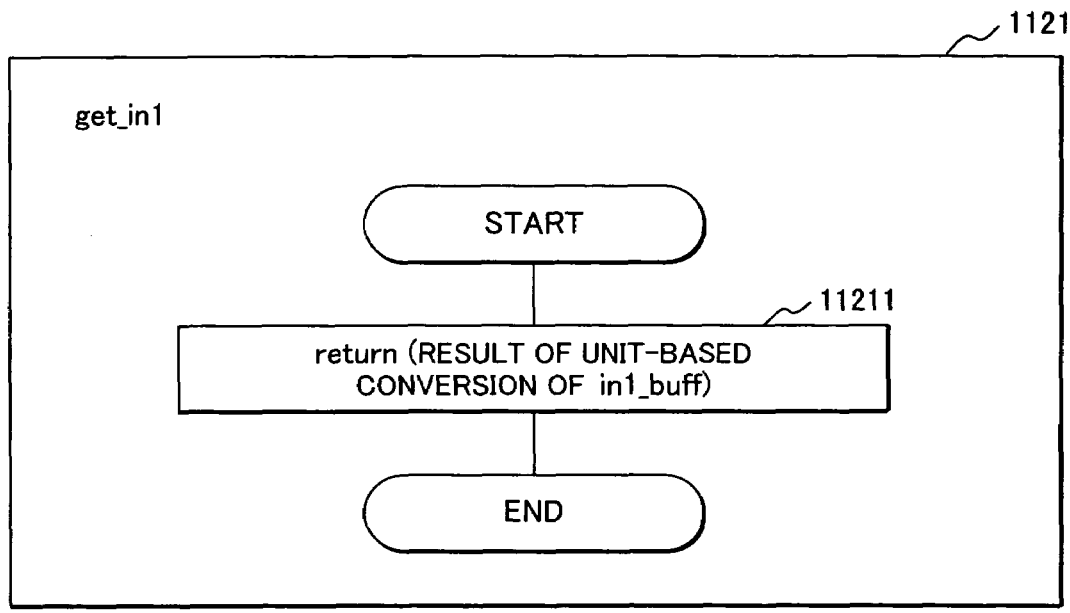
FIG. 15 is a flow chart representing the digital input in input value acquisition processing.

FIG. 14 represents the configuration of the output value storage buffer 115. The out1 is stored in the out1_buff storage buffer 1151. The out2 is stored in the out2_buff storage buffer 1152. The out3 is stored in the out3_buff storage buffer 1153. The out4 is stored in the out4_buff storage buffer 1154.

FIGS. 15 through 18 are flow charts representing the input value acquisition processing 112. Processing 1121 of FIG. 15 returns the information in1_buff stored in the input value storage buffer 114. The information to be transferred is the result of unit-based conversion performed in conformity to the specifications described in the interface.

Figure 16:
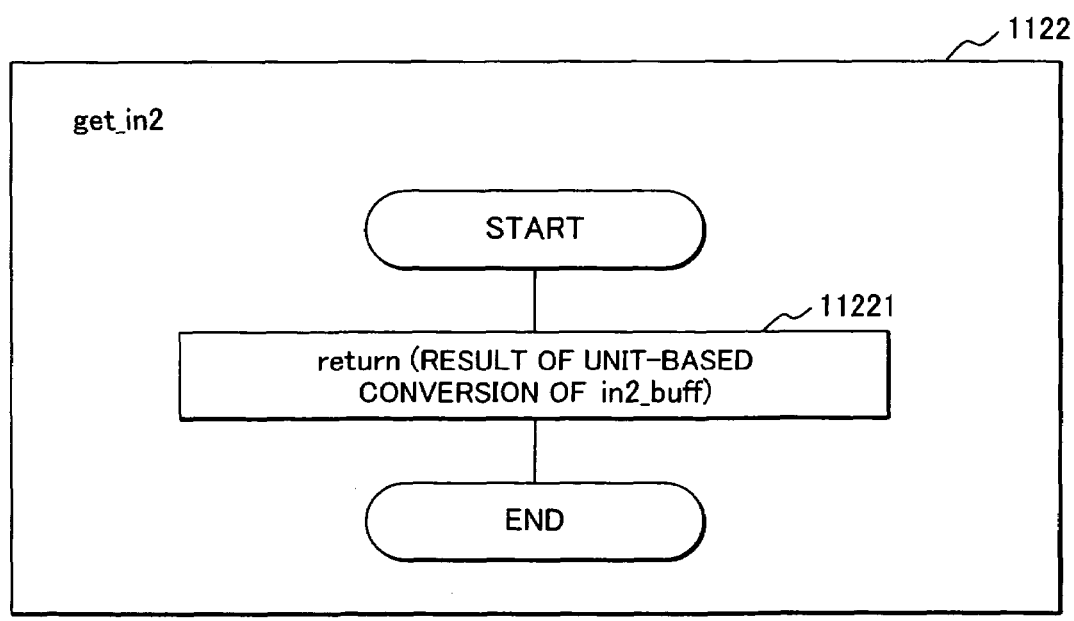
FIG. 16 is a flow chart representing the analog input in input value acquisition processing.
Figure 17:
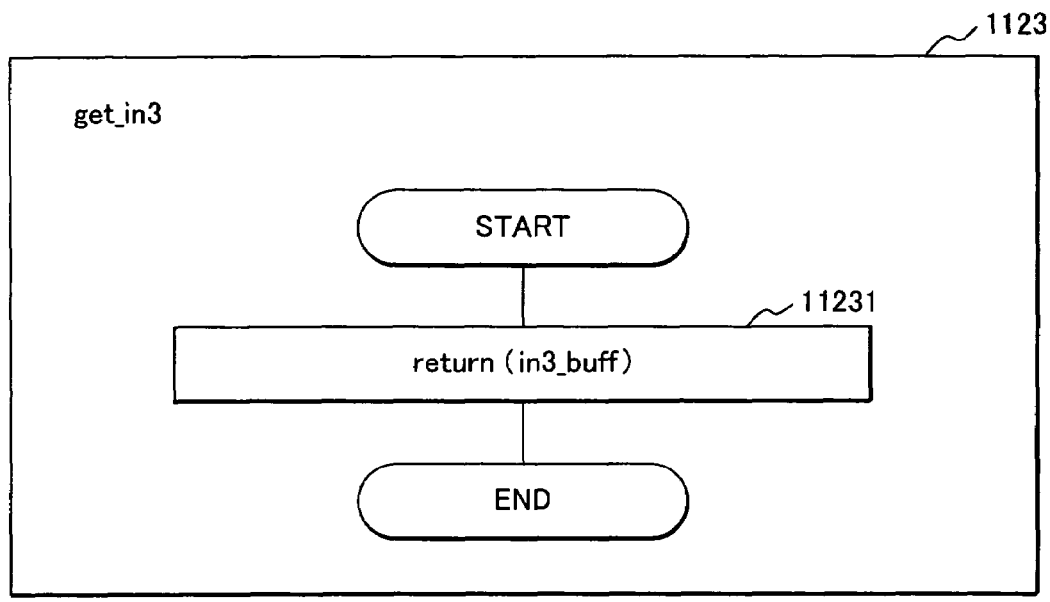
FIG. 17 is a flow chart representing the communication input in input value acquisition processing.

Processing 1122 of FIG. 16 corresponds to the input value acquisition processing of the in2. Processing 11221 returns the result of converting the value of the in2_buff based on a predetermined unit.

Processing 1123 of FIG. 16 corresponds to the input value acquisition processing of the in3. Processing 11231 returns the value of in3_buff directly to the application program 111.

Figure 18:
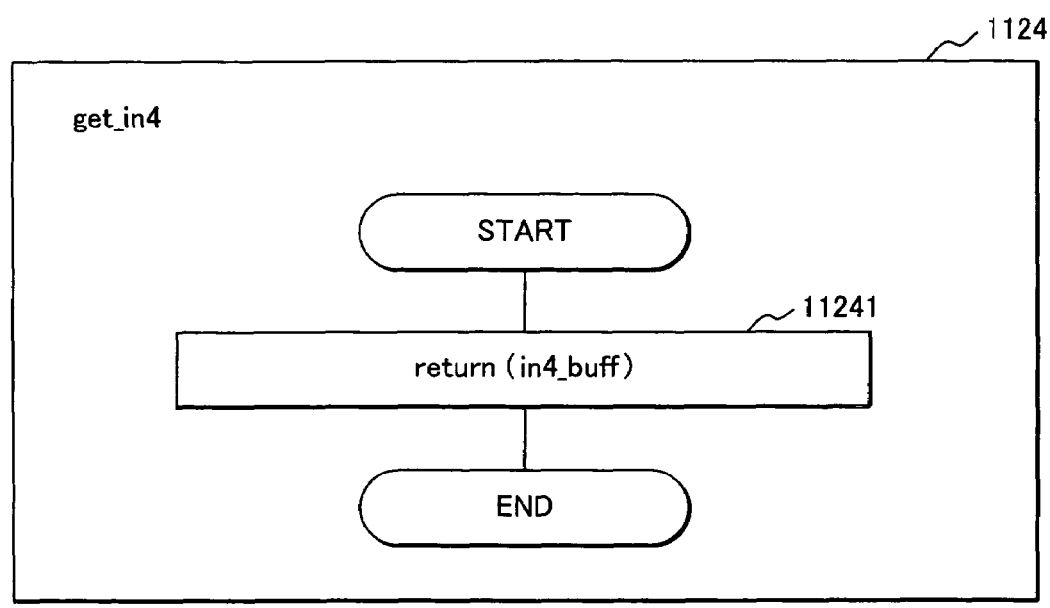
FIG. 18 is a flow chart representing the frequency input in input value acquisition processing.

Processing 1124 of FIG. 18 corresponds to the input acquisition of the in4. Processing 11241 returns the value of in4_buff directly.

Figure 19:
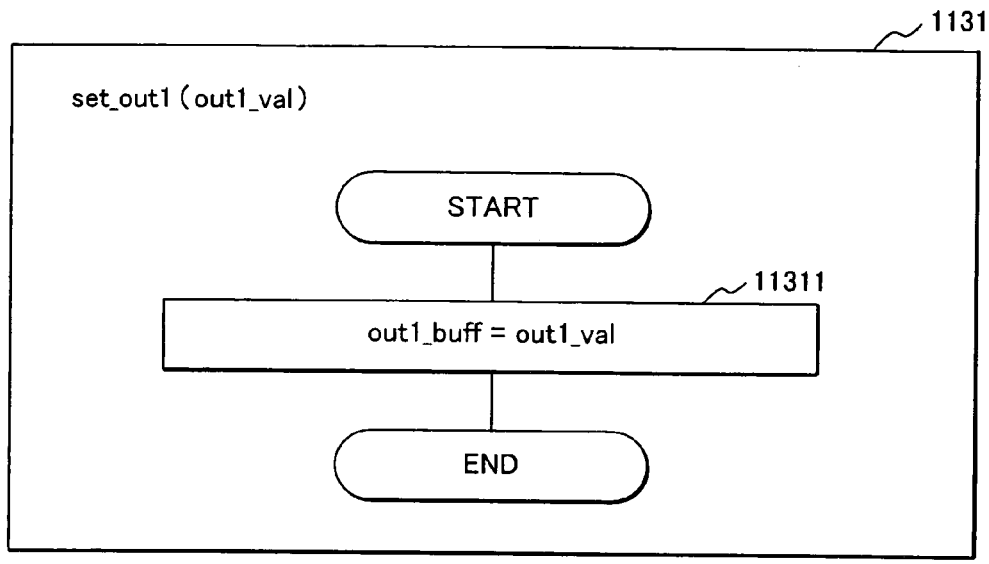
FIG. 19 is a flow chart representing the digital output in the output value updating processing.

FIGS. 19 through 22 are flow charts representing the output value updating 113. FIG. 19 shows the processing of updating the output value of the out1. Processing 11311 updates the value out1_val transferred from the application program 111, directly to the out1_buff.

Figure 20:
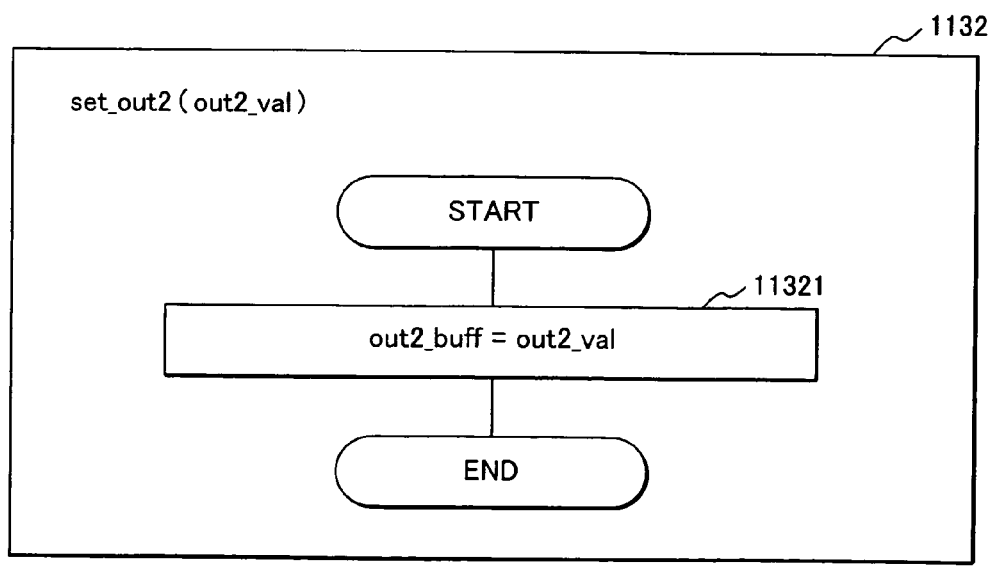
FIG. 20 is a flow chart representing the analog output in the output value updating processing.

FIG. 20 shows the processing of updating the output value out2. Processing 11321 updates the value out2_val transferred from thee application program 111, directly to the out2_buff.

Figure 21:
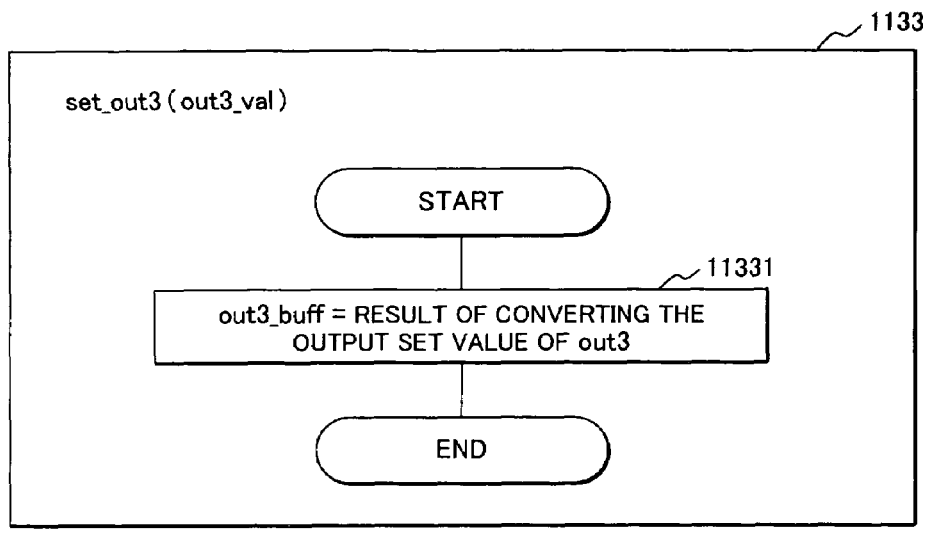
FIG. 21 is a flow chart representing the communication output in the output value updating processing.

FIG. 21 shows the processing of updating the output value out3. Processing 11331 converts the value out3_val transferred from the application program 111, according to a predetermined conversion formula and updates the result of conversion to the out3_buff.

Figure 22:
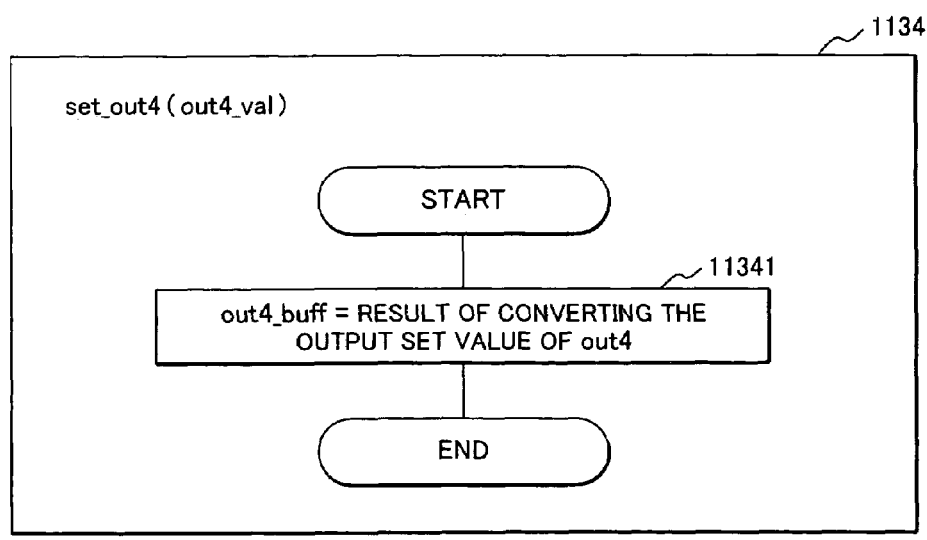
FIG. 22 is a flow chart representing the frequency output in the output value updating processing.

FIG. 22 shows the processing of updating the output value out4. Processing 11341 converts the value out4_val transferred from the application program, according to a predetermined conversion formula and updates the result of conversion to the out4_buff.

FIG. 23 indicates a 10-msec task processing flow. Processing 1211 by the 10-msec task described with reference to FIG. 2 initiates the 10-msec application. Then processing 1213 initiates the 10-msec event post-processing. Initiation processing 119 is initiated in processing 1211 and 1213, as described above.

Figure 24:
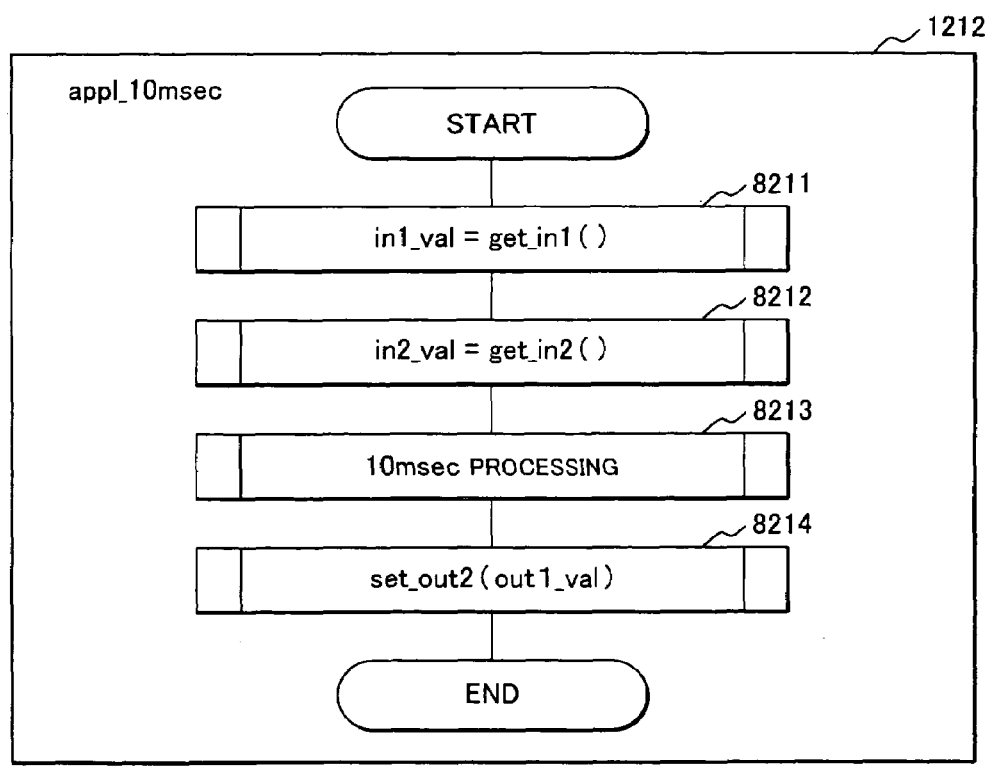
FIG. 24 is a flow chart representing the 10-msec application processing.

FIG. 24 is a flow chart representing the appl_10-msec by the 10-msec application 1212 as one of the application programs 111. Processing 8221 acquires the value of in1 through the get_in1, and updates it to in1_val. Processing 8212 acquires the value of in2 through the get_in2, and updates it to in2_val. Processing 8213 executes 10-msec processing in response to these input values and internal states, and updates the out1_val. Processing 8214 sets the out1_val to the output value storage buffer 115 through the set_out1.

Figure 25:
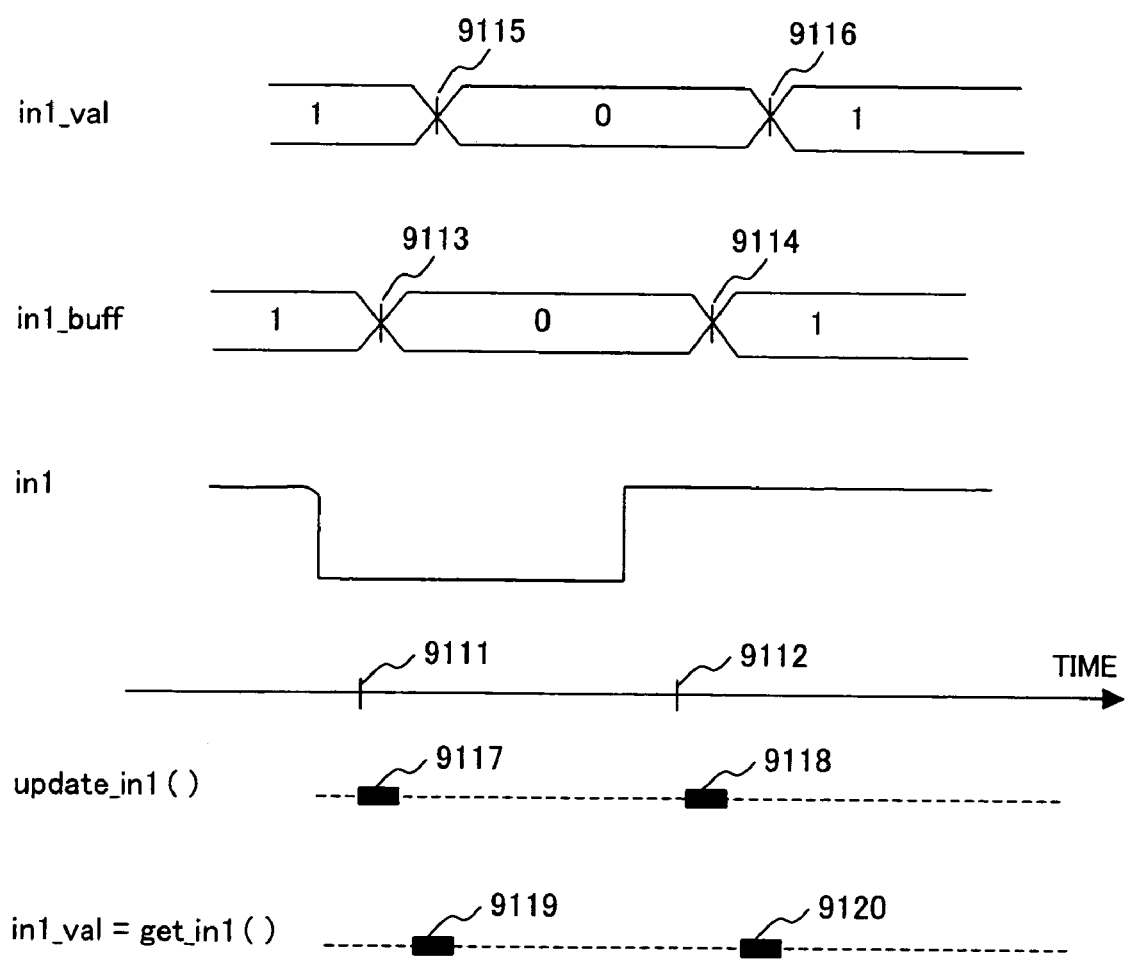
FIG. 25 is a timing chart representing the operation of input processing.

The following describes the input operation in the present Embodiment. FIG. 25 shows the input 1 and timing chart related thereto. Timing 9111 and timing 9112 refer to 10-msec event. Timing 9113 and timing 9114 refer to the timing when update_in1 (10-msec pre-processing) is executed. The appl_10m is executed at timing 9115 and 9116. Processing 9117 and 9118 update the in1_buff. Processing 9119 and 9120 updates the in1_val.

Figure 26:
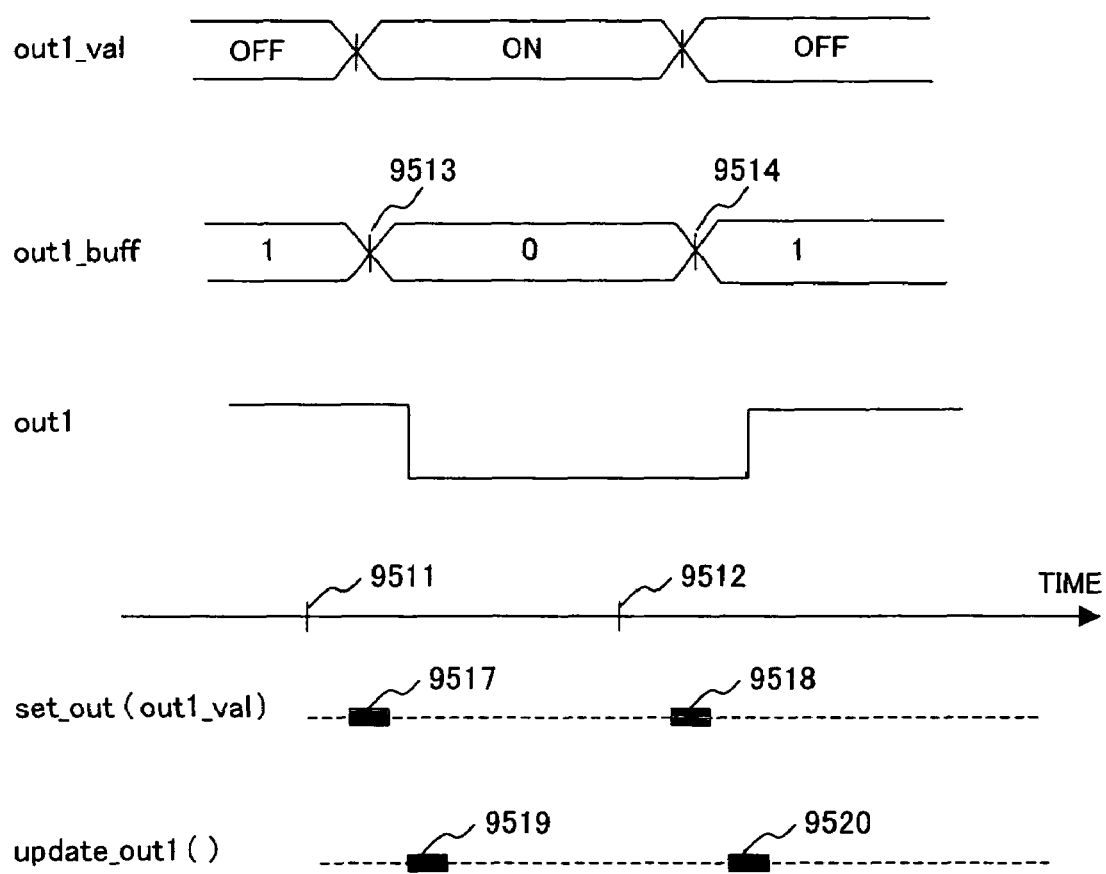
FIG. 26 is a timing chart representing the operation of output processing.

FIG. 26 shows the output signal out1 and timing chart related thereto. Timing 9511 and timing 9512 refer to 10-msec event. Timing 9513 and timing 9514 refer to the timing when set_out1 (10-msec post-processing) is executed. The out1_buffer is updated at this timing. The subsequent timing refers to the timing when update_out1 is called. Processing 9117 and 9118 update the out1_buff. Processing 9519 and 9520 updates the output signal out1 in conformity to the value of out1_buff.

In the present embodiment, timing for measurement and output can be changed easily by adjusting settings of the initiation table 118, without having to change the interface software. For example, when the measurement timing of the input signal in1 is to be changed from the 10-msec pre-processing to the 20-msec pre-processing, the update_in1 of the initiation table 118 should be shifted from the 10-msec pre-processing to the 20-msec pre-processing. No other change is necessary.

The present invention is applicable to a control unit constituting a control system required to provide real-time processing, as in automotive control. It easily changes the timing for the measurement of the input value of the external signal connected to the control unit as well as the timing for outputting.

Embodiment 2

In Embodiment 1, the input measurement processing 116 and output processing 117 are initiated by initiation processing 119. They can also be initiated by the application program 111.

The control unit of the present embodiment includes: storage means for storing an input value from the outside or an output value to the outside separately for each input/output signal; input means for measuring the input signal from the outside and updating the input value stored in the storage means; and output means for outputting the output signal to the outside in response to the output value stored in the storage means. This control unit further contains: input value acquisition means for transferring to an application program the input value stored in the storage means; and output value updating means for storing into the storage means the output value transferred from the application program. Further, the input means and output means are initiated in response to the timing preset in the aforementioned application program.

In the conventional art, acquisition of the input value by the input value acquisition processing 112 and updating of the output value by the output value updating 113 have been implemented, but the timing for measuring the input value measurement and outputting the output value has been fixed. By contrast, the Embodiment 2 allows the initiation timing to be changed as desired, through direction description of the input measurement processing 116 and output processing 117 by the application program, although there is no initiation means described with reference to the Embodiment 1. To put it more specifically, the processing 9117 and processing 9118 can be called from the application, as is apparent from FIG. 25.

Figure 27:
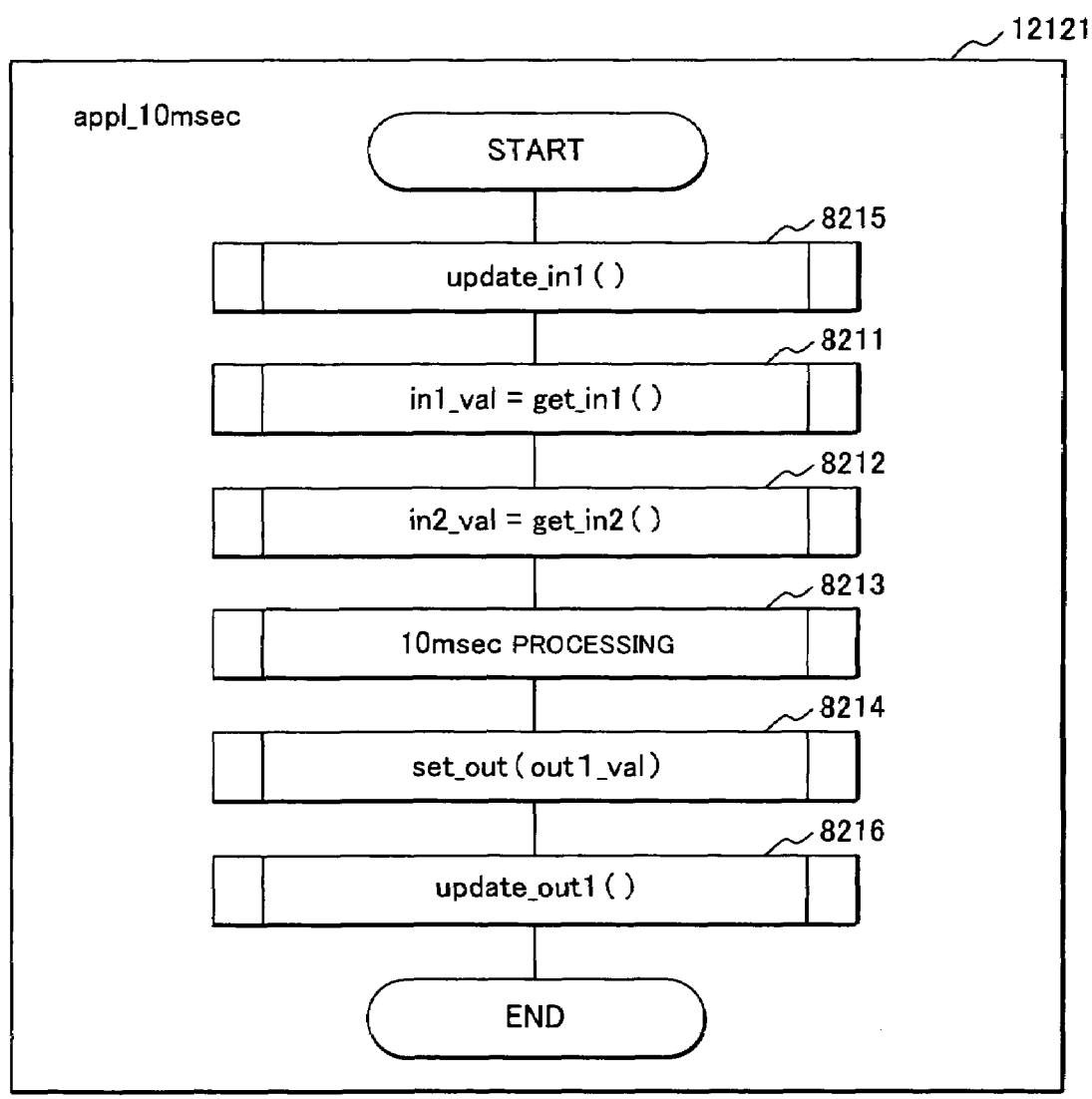
FIG. 27 is a flow chart representing the processing wherein the processing of timing is called by the application program.

FIG. 27 is a flow chart representing the 10-msec application processing wherein the processing of timing is called by the application program. Processing 8215 measures the input value in1. Processing 8211 receives the in1 and stores it in the int_val. Processing 8213 executes the application processing. Processing 8214 sets the out1 calculated in the processing 8213. Processing 8216 outputs the out1. In the present example, the in2 is a value having been obtained by measurement at a predetermined timed interval. Measurement processing is not called by the application program.

In the present embodiment, the timing for measurement can be changed without having to change the interface software. This description is also applicable to the output process: The output timing can be changed by calling the update_out1 from the application program 111, without having to change the interface software.

The present invention is applicable to a control unit constituting a control system required to provide real-time processing, as in automotive control. It easily changes the timing for the measurement of the input value of the external signal connected to the control unit as well as the timing for outputting.

Embodiment 3

The following describes the case wherein the aforementioned embodiment 1 is applied to a vehicle engine control. The vehicle engine control unit of the present invention includes: storage means for storing an input value from a sensor and others or an output value to an engine control unit separately for each input/output signal; input means for measuring the input from the sensor and others, and updating the input value stored in the storage means; and output means for outputting an output signal to the engine control unit in according with the value stored in said storage means. This vehicle engine control unit also includes: input value acquisition means for transferring the input value stored in said storage means to an engine control program; output value updating means for storing the output value transferred from the engine control program into the storage means; initiation means for initiating said input means and output means, and initiation timing storage means for storing the initiation timing. Further, the input means and output means are initiated by said initiation means in response to the timing stored on said initiation timing storage means.

According to the above description, the input signal in1 of the embodiment 1 refers to a digital input and corresponds to the ignition switch or the like. The digital output signal out1 corresponds to a power train relay or the like. The input signal in2 is an analog input and corresponds to a water temperature or oxygen sensor.

Input signal in3 is the information received from another control unit through communication, and corresponds to vehicle speed or gear position (e.g. first gear or neutral position), for example. The output signal out3 is the information to be sent to another control unit, and corresponds to the state of the control unit (e.g. engine speed), for example. The input signal in4 is a pulse input and corresponds to the sensor outputting pulses in response to the crank angle. The output signal out4 is a pulse and corresponds to ignition signal or injection signal, for example.

In the engine control, processing is divided into two forms; the processing at fixed intervals and processing synchronous with engine rotation. In processing synchronous with engine rotation, the ignition control (ignition position and current application time before ignition) and injection control (injection timing and amount of injection) are performed in response to the state of the vehicle such as engine speed.

What is claimed is:

1. A vehicle engine control unit comprising:

storage means for storing an input value from a sensor and others or an output value to an engine control unit separately for each input/output signal;

input means for measuring the input from the sensor and others, and updating the input value stored in said storage means;

output means for outputting an output signal to the engine control unit in according with the value stored in said storage means;

input value acquisition means for transferring the input value stored in said storage means to an engine control program;

output value updating means for storing the output value transferred from said engine control program into said storage means;

initiation means for initiating said input means and output means; and initiation timing storage means for storing the initiation timing, wherein said input means and output means are initiated by said initiation means in response to the timing stored on said initiation timing storage means.

2. A control unit comprising:

storage means for storing an input value from the outside or an output value to the outside separately for each input/output signal;

input means for measuring the input signal from the outside and updating the input value stored in the storage means;

output means for outputting an output signal to the outside in according with the value stored in said storage means;

input value acquisition means for transferring the input value stored in said storage means to an application program;

output value updating means for storing the output value transferred from said application program into said storage means;

initiation means for initiating said input means and output means; and initiation timing storage means for storing the initiation timing, wherein said input means and output means are initiated by said initiation means in response to the timing stored on said initiation timing storage means.

3. A control unit comprising:

storage means for storing an input value from the outside or an output value to the outside separately for each input/output signal;

input means for measuring the input from the outside and updating the input value stored in said storage means;

output means for outputting an output value to the outside in according with the value stored in said storage means;

input value acquisition means for transferring the input value stored in said storage means to an application program; and output value updating means for storing the output value transferred from said application means into said storage means, wherein said input means and output means are initiated in response to the timing set in said application program.

4. The control unit according to claim 2, wherein said input means and output means are initiated in response to the timing stored on said initiation timing storage means, and implements said processing for each signal.

5. The control unit according to claim 2, wherein the contents stored in said initiation timing storage means are set and stored by an initiation timing registration means.

6. The control unit according to claim 3, wherein said input means is initiated by said application program.

7. The control unit according to claim 3, wherein said output means is initiated by said application program.